May 26, 1953     I. V. ZOZULIN ET AL     2,640,166
DRIVE COUPLING OF THE PERMANENT MAGNET TYPE
Filed April 12, 1952
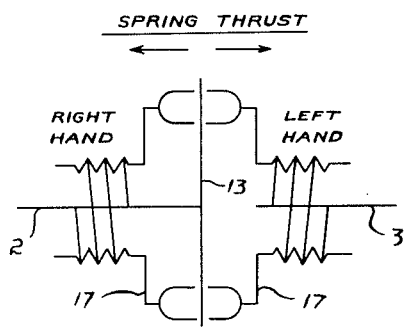
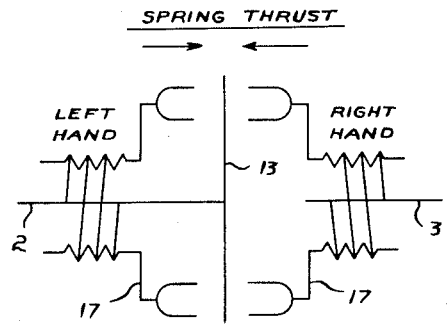
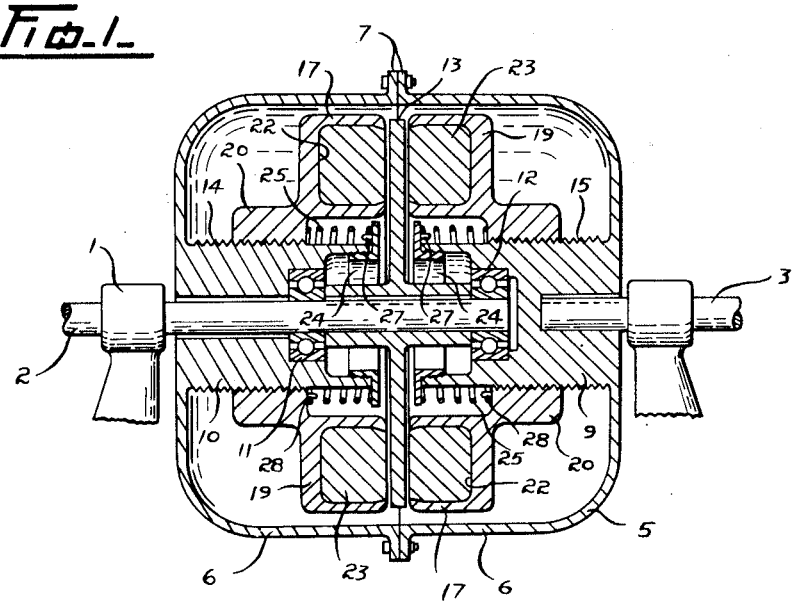
INVENTORS
IGOR V. ZOZULIN
GEORGE J. OKULITCH
GEORGE M. VOLKOFF
VLADIMIR J. OKULITCH
ALEC SYDNEY JOHN ELLETT
*Ernest E Carver*
PATENT ATTORNEY Patented May 26, 1953

2,640,166

UNITED STATES PATENT OFFICE 2,640,166

DRIVE COUPLING OF THE PERMANENT MAGNET TYPE

Igor V. Zozulin, George J. Okulitch, George M. Volkoff, Vladimir J. Okulitch, and Alec S. J. Ellett, Vancouver, British Columbia, Canada Application April 12, 1952, Serial No. 282,072

4 Claims. (Cl. 310—94)

Our invention relates to improvements in drive couplings of the permanent magnet type, wherein it is desirable to provide a high torque to the output shaft at variable speeds consistent with the power of the motor driving the input shaft, and to provide means whereby the imposition of an overload on the motor will cause a progressive diminution of torque which may permit the output shaft to come to rest and allow the motor to run with but little load. Another object of the invention is to provide means within the coupling whereby the easing of the load on the output shaft to that within the capacity of the motor driving said coupling will actuate the coupling to pick up said reduced load. Further objects are to fully enclose the operating parts, so that they may be kept thoroughly lubricated, and also to provide a structure having very few parts which require no adjustment and which are subject to very little wear when operating.

Referring to the accompanying drawings.

Figure 1 is a longitudinal sectional view of the invention shown at rest.

Figure 2 is a diagrammatic view showing the direction of the screw threads in the coupling to provide constant torque to be transmitted by the springs.

Figure 3 is a diagrammatic view showing the direction of the screw threads in the coupling to provide constant speed being imparted to the driven shaft.

In the drawings like characters of reference indicate corresponding parts in each figure.

The numeral 1 indicates generally a pair of bearings supporting aligned shafts 2 and 3, the shaft 2 being an input shaft rotated by a motor or any other source of power, and the shaft 3 being adapted for connection to a pump, an agitator or other piece of equipment. Secured to the inner end of the shaft 3 is a housing 5, made up of two cylindrical portions 6 having complementary coupling flanges 7. One of the cylindrical portions 6 is provided with a central core 9 by which it is keyed to the shaft 3 and the other has a similar core 10 supporting an anti-friction bearing 11 in which a part of the input shaft 2 is journalled. A bearing 12 is mounted in the inner end of the core 9 to journal the end of the shaft 2. To the inner end of the shaft 2 a rotor 13 is secured, which rotor, in the embodiment here shown, is a metallic disk of high magnetic permeability such as copper, or such other metal or metals as may be desired.

The cores 9 and 10 are externally provided with right and left hand screw threads 14 and 15 respectively, and freely rockable upon the threaded portions are driven rotors 17. The rotors 17 each consist of an annular flange 19 extending from a hub 20, which hub is internally threaded to fit its complementary thread 14 or 15. The flange 19 is provided with an annular groove 22 in which permanent magnets 23 are regularly spaced, so as to provide north and south poles alternatively to the periphery of the rotor 13. A flanged collar 24 is fitted to the inner end of each of the cores 9 and 10, which forms an abutment for a torsion spring 25. The springs 25 are right and left hand and have their inner ends anchored against rotation to a collar 24, as at 27 and have their opposite ends anchored to the hub 20 as at 28. The setting of the rotors 17 is such that the anchored springs 25 maintain the north poles of the magnets 23 of one rotor directly opposed to the south poles of the magnets of the other rotor 17, so that the lines of force will, under normal operating conditions, pass from the north pole of one magnet, through the rotor 13 to the south pole of the other magnet, so that maximum torque between the magnets may be obtained.

In operation, the shaft 1 is set in motion, imparting rotation to the disk rotor 13 at a given speed. The eddy currents as between opposed pairs of magnets 23 will cause the rotors 17 to turn and the shaft 3 to pick up its load. The drag of the load or resistance to rotation of the rotors 17 and the housing 5 will cause the rotors 17 to move as their hubs 20 move along the threads 14 and 15. If the threads on the cores 9 and 10 are of such direction that an increase in the torque transmitted by the springs 25 causes each driven rotor 17 to separate, see Figure 2, then the coupling will develop a constant torque. If on the other hand the threads on the cores 9 and 10 are of such direction that an increase of torque transmitted by the springs causes each driven rotor to approach the other, then the coupling will operate with a constant speed characteristic.

If an overload of dangerous proportion should develop to the coupling, as shown in Figure 1, the twin rotors will recede from each other to the point where the torque drops to such an extent that any portion of the load which is still moving can still be carried and without danger to the equipment.

What we claim as our invention is:

1. A permanent magnetic coupling adapted to be fitted to aligned input and output shafts comprising a disk rotor secured upon one shaft, a core secured upon the other shaft, a second rotor rockingly mounted upon the core and in face to face proximity to the disk rotor, one of said rotors being fitted with magnets to provide a rotational tractive force to the other and a flexible torsional member connecting at one end to the second rotor and at its opposite end to the core to permit a limited rotational movement relative to each other and subsequently restore the second rotor and the core to their normal positions of angularity.

2. A permanent magnetic coupling adapted to be fitted to aligned input and output shafts, said coupling comprising a core member adapted to be fitted upon one of the shafts, said core having an external thread, a rotor concentric with and freely rockable upon the thread of the core, a disk rotor adapted to be secured upon the second shaft to run face to face with the rotor, a coil spring having one end attached to the core and the opposite end connected to the rotor to permit a rotational movement between the core and rotor and to cause a movement of the first named rotor lengthwise of the thread, one of said rotors having an annular ring of permanent magnets adapted to attract the other rotor, said spring being a torsional member to return the core and its rotor to their normal positions of angularity as the coupling comes to rest.

3. A permanent magnetic coupling adapted to be fitted to aligned input and output shafts, said coupling comprising a housing having aligned cores, each having an external thread, one of said cores adapted to be secured to one of said shafts and the other of said cores being adapted to rotate freely upon the other shaft, a rotor rockingly mounted on the thread of each core and a spring flexibly connecting each rotor to its core whereby each rotor has movement relative to its core, a disk rotor mounted upon one of the shafts and being concentric with the first named rotors, said first named rotors being fitted with a plurality of magnets coacting with the disk rotor to impart a drive between said rotors and the disk rotor.

4. A permanent magnetic coupling adapted to be fitted to aligned input and output shafts and comprising a disk rotor secured on one shaft and a second rotor freely journalled upon the second shaft, a threaded member interposed between the second rotor and the second shaft, said second rotor being in threaded engagement with the threaded member and a spring operatively connecting the second rotor to the second shaft, one of said rotors having a plurality of circumferentially spaced permanent magnets set to influence the adjacent rotor, said spring serving as a torsional member to resist angularity between the second rotor and the second shaft.

IGOR V. ZOZULIN.
GEORGE J. OKULITCH.
GEORGE M. VOLKOFF.
VLADIMIR J. OKULITCH.
ALEC S. J. ELLETT.

References Cited in the file of this patent

UNITED STATES PATENTS

| Number | Name | Date |
| --- | --- | --- |
| 1,950,810 | Nichols | Mar. 13, 1934 |
| 2,220,163 | List | Nov. 5, 1940 |
| 2,536,207 | Norman | June 21, 1951 |